Dec. 31, 1963  E. H. REICHL  3,116,143
ORE REDUCTION PROCESS UTILIZING COAL-WATER
SLURRIES IN A BLAST FURNACE
Filed April 19, 1960
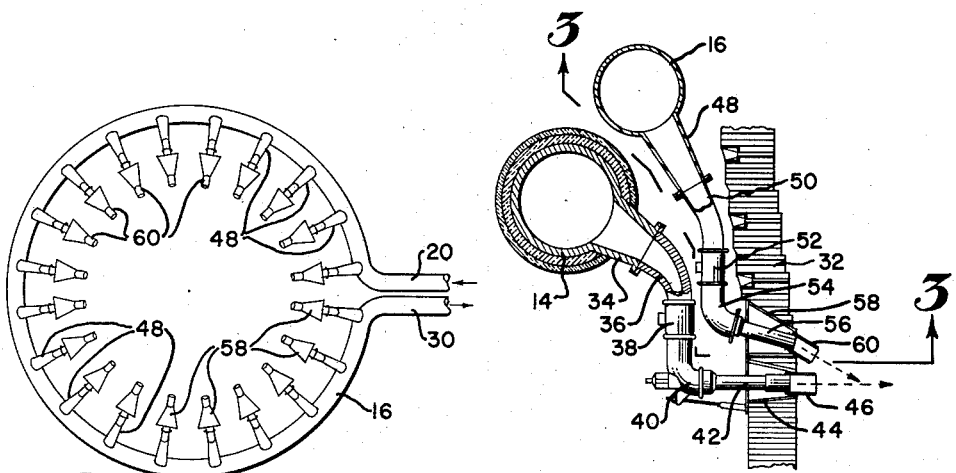
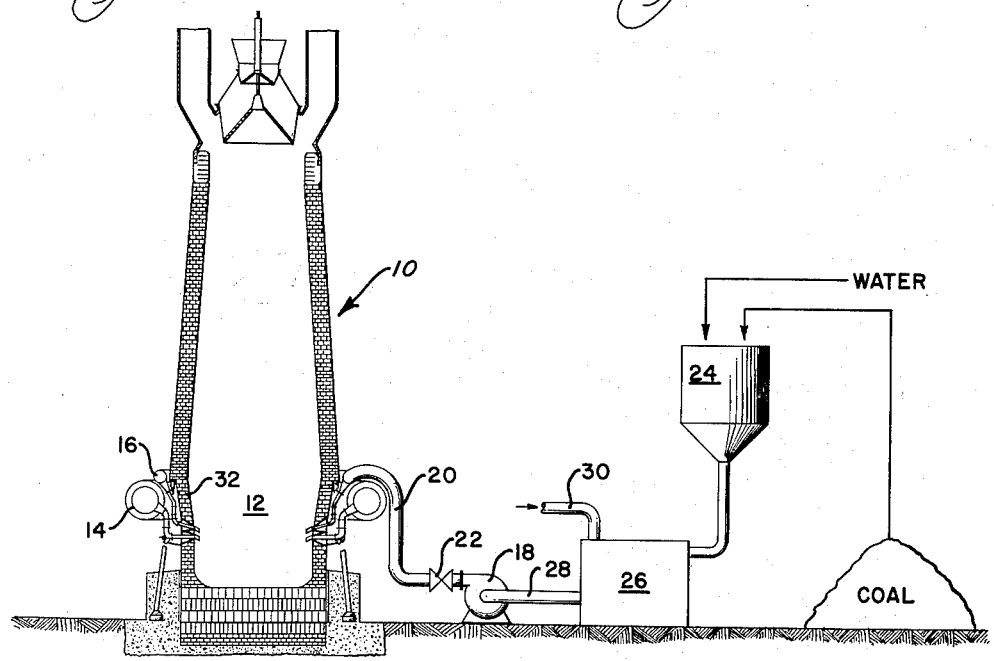
INVENTOR.
ERIC H. REICHL
BY
HIS ATTORNEY › # United States Patent Office 3,116,143
Patented Dec. 31, 1963

3,116,143
ORE REDUCTION PROCESS UTILIZING COAL-WATER SLURRIES IN A BLAST FURNACE
Eric H. Reichl, Pittsburgh, Pa., assignor to Consolidation Coal Company, Pittsburgh, Pa., a corporation of Pennsylvania
Filed Apr. 19, 1960, Ser. No. 23,180
5 Claims. (Cl. 75—42)

This invention relates to an improved blast furnace process for ore reduction and apparatus therefor, and more particularly to a method of, and apparatus for, injecting solid carbonaceous material into the hearth portion of a blast furnace.

A blast furnace functions to reduce ore containing oxides of iron to metallic iron. A charge of ore, fuel and flux is introduced into the furnace and coacts to successively reduce the ore to ferrous oxides and then to metallic iron. The liquid metallic iron collects at the bottom of the furnace where it is drawn off at predetermined intervals.

The fuel included in the blast furnace charge is usually a carbonaceous material such as coke. The function of the coke is twofold: first, it supplies fuel to produce the heat to attain the necessary temperatures for the metallurgical reducing reactions to take place; and second, it supplies the reducing agent for the process of reducing or removing the oxygen from the iron oxides of the ore.

One method of decreasing the overall cost of the blast furnace reduction process is to reduce the amount of coke required per ton of iron produced. When the temperature in the hearth portion of the blast furnace is increased, thereby increasing the combustion rate of the coke, it has been found that there is a substantial decrease in the amount of coke required per ton of iron produced.

Several methods of increasing the hearth temperature of the blast furnace have been suggested. These methods are directed principally to treating the blast gas entering the furnace to either enrich its oxygen content or to increase the preheating of the blast gas. The present invention contemplates increasing the hearth temperature of the blast furnace by injecting solid carbonaceous material directly into the hearth of the furnace by a novel method.

In addition to determining the amount of coke required per ton of iron produced, the temperature of the furnace is one of the two main factors which control the quality of the iron produced. The other factor is the composition of the slag material. Iron produced at higher furnace temperatures generally has a higher silicon content and a reduced sulfur content. The method and apparatus of the present invention contemplates means to control the rate of injection of solid carbonaceous material into the furnace hearth so that the temperature of the furnace, and therefore the quality of the iron, may be more accurately controlled.

Since the material injected into the furnace in the practice of the present invention is carbonaceous, it increases the amount of reducing agent present in the furnace and thereby insures that the reduced amount of cake utilized does not adversely affect the complete reduction of the ore into its component parts. The direct injection of the solid carbonaceous material also improves the uniformity of distribution of the furnace charge.

The present invention contemplates the injection of the solid carbonaceous material into the blast furnace hearth in the form of a highly concentrated water slurry of fine coal. The slurry is conducted to the furnace and circulated through a slurry bustle pipe similar to the conventional bustle pipe for the blast gas of the furnace. The slurry is injected into the hearth of the furnace from the slurry bustle pipe through tuyeres which are similar to the tuyeres utilized to inject the blast gas into the furnace. The slurry tuyeres inject the slurry into the hearth and into the path of the stream of blast gas injected by the conventional tuyeres so that the slurry is entrained in the stream of blast gases. Combustion of the coal slurry then takes place within the furnace hearth.

Recent advances in the preparation and transportation of coal-water slurries makes possible the practice of the present invention. These advances enable a stabilized slurry containing more than 60% by weight of coal to be pumped, just as fuel oil would be pumped, through appropriate pipelines. The manner of preparation and transportation of this concentrated, stabilized slurry is disclosed in detail in U.S. patent application Serial Number 9,884, filed February 19, 1960, entitled "Preparing Coal for Transportation by Pipeline."

To briefly summarize the contents of that patent application, coal and water are mixed to form a slurry containing at least 60% by weight of coal. This mixture is then subjected to external energy such as closed circuit pumping through a centrifugal pump until the slurry becomes what is termed "stabilized." The "stabilized" slurry has certain distinguishing properties. It is gel-like when at rest. There is little or no settling of the coal particles from the slurry even over long periods of unagitated storage. At the same time, the stabilized slurry is plastic-like and may be pumped through a pipeline with low energy pumping requirements. The stabilized slurry having concentrations of 60 to 70% by weight of coal exhibits the properties of a pumpable fluid when in motion.

Due to the high coal concentration of the stabilized slurry, it may be injected directly into the hearth of a blast furnace and burned. Because of the relatively small amount of water present in the slurry, the heat required to vaporize it may be produced at the expense of only 4 to 5% of the coal entrained in the slurry. The overall moisture content within the furnace can be maintained by compensating for the slurry water that is vaporized by reducing slightly the amount of steam normally added to the blast gas of the furnace.

The stabilized slurry of coal may, at times, also serve as a vehicle for slightly larger particles of coal or coke. It has been found that the stabilized slurry inhibits the settling of larger particles and can entrain them for conveyance through a pipeline. Thus, in a particular application, a stabilized slurry of coal might be enriched with small amounts of particulate coke for controlled injection directly into the hearth of a blast furnace.

With the foregoing considerations in mind, it is the primary object of the present invention to provide improved blast furnace reduction of iron ore.

Another object of this invention is to increase the temperature of a blast furnace by injecting solid carbonaceous material directly into the hearth of a blast furnace.

Another object of this invention is to reduce the required amount of coke per ton of iron produced in the blast furnace reduction of iron ore.

Another object of this invention is to provide accurate temperature control for a blast furnace by controlling the injection of solid carbonaceous material into a blast furnace hearth.

These and other objectives achieved by this invention will become apparent as this description proceeds in conjunction with the accompanying drawings, in which drawings:

FIGURE 1 is a semi-schematic view of the apparatus of the present invention installed on a conventional blast furnace.

FIGURE 2 is a partial section, drawn to an enlarged scale, of the injection apparatus shown in FIGURE 1.

FIGURE 3 is a view taken along line 3—3 of FIGURE 2 showing the arrangement of the bustle pipe and tuyeres for the injection of solid carbonaceous material into the blast furnace.

Referring now to the drawings, and particularly to FIGURE 1, there is shown a blast furnace 10 in elevational section. The blast furnace has a hearth portion 12 about which is disposed a bustle pipe 14 which encircles the furnace and conducts blast gas thereto from a blast gas stove (not shown).

Also disposed about the furnace, adjacent to the bustle pipe 14, is a slurry bustle pipe 16 which is adapted to circulate a stabilized water slurry of coal and inject it into the hearth portion 12 of the furnace 10. The slurry is fed to the slurry bustle pipe 16 by a centrifugal pump 18 through a slurry conduit 20. Conduit 20 contains a shut off valve 22.

The stabilized slurry may be prepared in the vicinity of the blast furnace, or it may be conducted to the blast furnace site through miles of pipeline. In either event, the slurry is prepared by mixing a quantity of coal and water in a mixing vessel 24. The coal and water, containing upwards of 60% by weight of coal and preferably about 65% coal is mixed within the vessel 24 and conducted to a slurry stabilizer 26. The stabilizer 26 may include a centrifugal pump (not shown) to circulate the mixture from vessel 24 in a closed circuit until it has stabilized slurry properties as discussed in the aforesaid patent application Serial Number 9,884. Any external source of energy which will act upon the mixture of coal and water from vessel 24 and impart stabilized slurry properties to it can form slurry stabilizer 26.

The stabilized slurry is withdrawn from the stabilizer 26 through conduit 28 and enters the centrifugal pump 18. The slurry is pumped through conduit 20 to the slurry bustle pipe 16, circulated through pipe 16 and the excess slurry is returned to the stabilizer 26 through the return conduit 30. The shut off valve 22 may be closed to prevent the circulation of slurry through bustle pipe 16 when the furnace is not in operation, or when it is desired to operate the furnace without coal injection.

FIGURE 2 shows in detail the injection tuyeres for the conventional blast gas and the stabilized slurry. FIGURE 2 is a partial sectional view similar to FIGURE 1 on an enlarged scale. The wall 32 of the furnace hearth portion 12 is formed of fire brick or the like. Surrounding the furnace hearth portion 12 are the previously described blast gas bustle pipe 14 and the slurry bustle pipe 16.

In conventional fashion, the bustle pipe 14 has a plurality of conduit sections 34 extending radially inwardly therefrom toward the wall 32 of the furnace. One of these conduit sections is shown in FIGURE 2. Each of these conduit sections communicate with a goose neck 36 which in turn communicates with a control valve 38. The control valves 38 each join to a tuyere stock 40. Extending generally horizontally and radially inwardly from the tuyere stock 40 is a blow pipe 42. The end of blow pipe 42 is received within a conical cooling casting 44 which supports the tuyere 46. The cooling casting provides water cooling means for the blow pipe 42 and the tuyere 46 in a conventional manner.

The tuyere 46 is the nozzle through which the blast gas from bustle pipe 14 enters the furnace. The stream of blast gas is directed radially inwardly toward the center of the furnace as indicated by the arrow in FIGURE 2.

To practice the present invention, a slurry bustle pipe 16 is provided adjacent pipe 14. Slurry bustle pipe 16 has a plurality of inwardly extending conduit sections 48 as shown in FIGURE 3. These conduit sections are similar to sections 34 of bustle pipe 14. As may also be seen in FIGURE 3, the slurry bustle pipe 16 is in communication with the conduit 20 through which slurry enters the bustle pipe 16 and the return conduit 30 which returns excess slurry to the stabilizer 26.

In FIGURE 2, one of the conduit sections 48 extending radially inwardly from slurry bustle pipe 16 is shown in section. Each of the conduit sections communicate with a goose neck 50 which in turn communicates with a control valve 52. Each of the control valves 52 joins to a tuyere stock 54, similar to the tuyere stock 40 of the blast gas system.

A blow pipe 56 is received by each of the tuyere stocks 54 and is supported at its other end within a cooling casting 58 similar to casting 44 of the blast gas system. Blow pipes 56 extend radially inwardly through the wall 32 of the furnace hearth, however, the blow pipes are disposed so that the end within the hearth is lower than the end outside the furnace wall. This disposition of blow pipe 56 permits gravity drainage of slurry from the bustle pipe 16 and the blow pipes if the shut off valve 22 is closed and the slurry injection system not utilized.

As in the case of the blast gas system, the individual cooling castings 58 support tuyeres 60 which are the nozzles to direct the slurry into the furnace. Tuyeres 60 are disposed so that they are in converging relation with the tuyeres 46 and thus direct the injected slurry into the path of the blast gas introduced into the hearth through tuyeres 46 as indicated by the arrows in FIGURE 2.

The cooling castings 44 for the blast gas system and the cooling castings 58 for the slurry injection system are conventional in construction and may be part of a common fluid cooling system.

As is well known in the blast furnace art, the individual control valves 38 of the blast gas system are remotely controlled electrically or pneumatically. They are interconnected to provide the proper amount of blast gas into the hearth and to insure uniform distribution of the gases about the hearth.

In a similar manner the individual control valves 52 of the slurry injection system may be remotely controlled electrically or pneumatically. They should be interconnected to insure uniform distribution of the slurry injection about the hearth. Any suitable control means similar to that employed for the blast gas system, may be employed to control the valves 52 of the slurry injection system.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A method for reducing the amount of coke required in the blast furnace type of ore reducing process which comprises injecting different sized particulate carbonaceous material in the form of a water slurry into the hearth portion of said blast furnace during the ore reducing process.

2. A method for reducing the amount of coke required in the blast furnace type of ore reducing process and providing a reducing agent for the ore reduction process which comprises injecting particulate coal in the form of a coal-water slurry into the hearth portion of said blast furnace, entraining said slurry in the stream of hot blast air within said hearth and burning said coal in said slurry within said hearth.

3. A method for reducing the amount of coke required in the blast furnace type of ore reducing process which comprises preparing a mixture of fresh coal particles and water, treating said mixture to form a stabilized slurry, conveying said slurry to a blast furnace through a conduit, and injecting said stabilized slurry into the hearth portion of said blast furnace for combustion therein during the ore reducing process.

4. A method of introducing coal into the hearth portion of an ore reducing blast furnace which comprises preparing a slurry of different sized coal particles and water in a slurry preparation zone, said different sized coal particles being uniformly distributed throughout said water and forming a suspension wherein said particles remain suspended in said water for a substantial period of time under quiescent conditions, said slurry having a solids content of at least about 60 percent by weight, introducing said slurry into a conduit which extends from the slurry preparation zone around the external portion of said blast furnace adjacent said hearth portion and returns to said slurry preparation zone, maintaining an inventory of said slurry in said conduit, withdrawing controlled amounts of said slurry from said conduit adjacent said blast furnace hearth portion and introducing said withdrawn slurry into the hearth portion of said blast furnace and entraining said slurry in the stream of hot blast gas within said hearth portion for combustion therein during the ore reducing process.

5. A method of introducing coal into the hearth portion of an ore reducing blast furnace which comprises preparing a slurry of different sized coal particles and water in a slurry preparation zone, said different sized coal particles being uniformly distributed throughout said water and forming a suspension wherein said particles remain suspended in said water for a substantial period of time under quiescent conditions, said slurry having a solids content of at least about 60 percent by weight, introducing said slurry into a conduit which extends from said slurry preparation zone around the external portion of said blast furnace adjacent said hearth portion and returns to said slurry preparation zone, maintaining an inventory of said slurry in said conduit, withdrawing controlled amounts of said slurry from said conduit adjacent said blast furnace hearth portion, introducing said controlled amounts of said withdrawn slurry into slurry feed tuyeres extending radially into the hearth portion of said blast furnace, said slurry feed tuyeres arranged adjacent to and in converging relation with the gas blast tuyeres of said blast furnace so that said slurry introduced into said blast furnace hearth portion through said slurry feed tuyeres is entrained by the hot gas introduced through said gas blast tuyeres in a manner that combustion of said coal particles and the vaporization of said water in said slurry takes place in said blast furnace hearth portion during the ore reduction process.

References Cited in the file of this patent

UNITED STATES PATENTS

| | | |
|---|---|---|
| 1,349,598 | Basset | Aug. 17, 1920 |
| 1,735,293 | Murakami | Nov. 12, 1929 |
| 1,889,160 | Strain et al. | Nov. 29, 1932 |
| 2,727,816 | Raick | Dec. 20, 1955 |
| 2,938,782 | Toulmin | May 31, 1960 |